May 9, 1967  A. E. PATRICK  3,318,084
TRANSISTOR ALARM CLOCK
Filed Oct. 2, 1964  2 Sheets-Sheet 1

INVENTOR.
ALAN E. PATRICK
BY Louis Altman
ATTORNEY

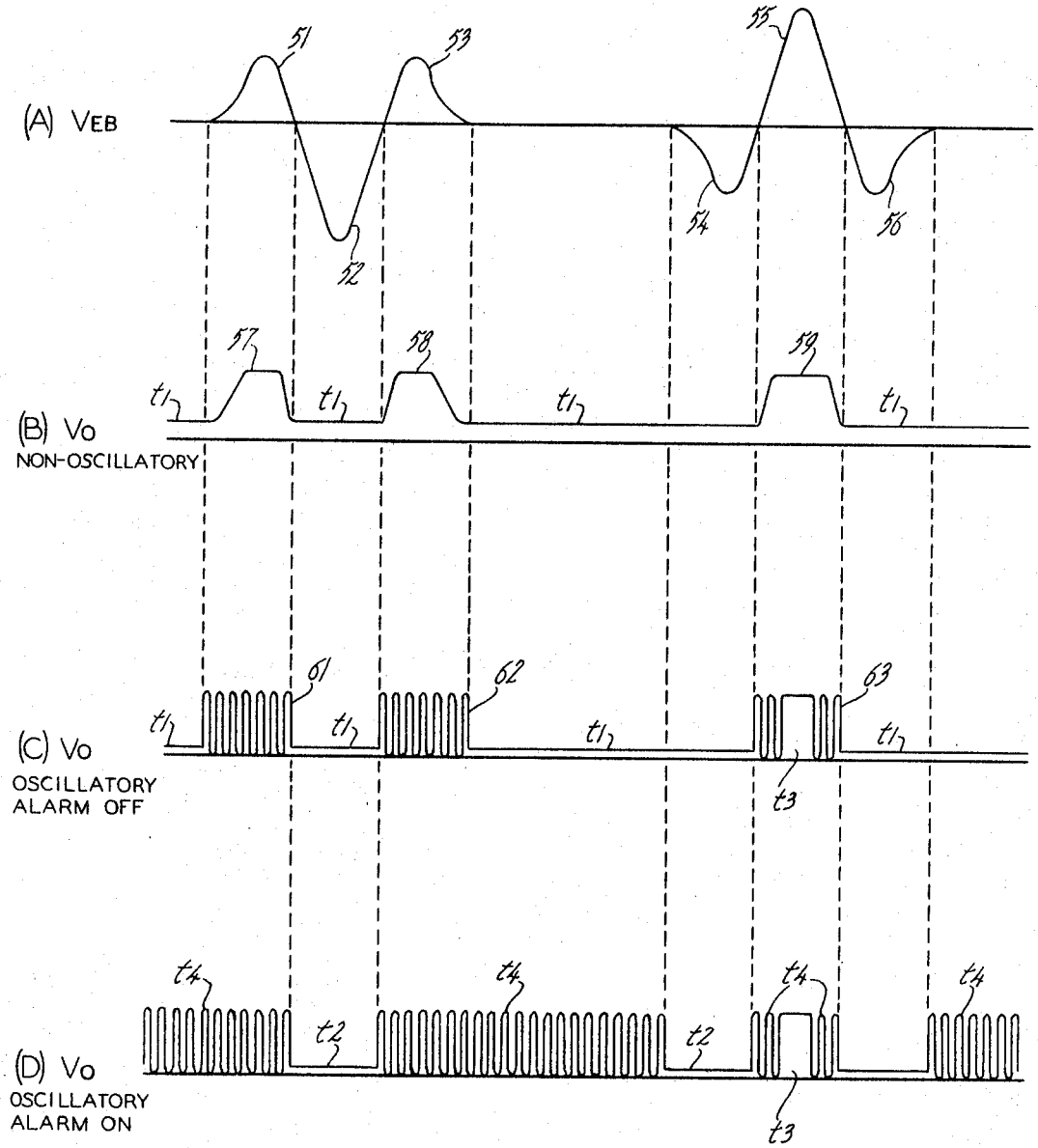

United States Patent Office 3,318,084
Patented May 9, 1967

3,318,084
TRANSISTOR ALARM CLOCK
Alan E. Patrick, Athens, Ga., assignor to General Time Corporation, New York, N.Y., a corporation of Delaware
Filed Oct. 2, 1964, Ser. No. 401,058
13 Claims. (Cl. 58—38)

A battery alarm clock employs a transistor circuit to impulse a balance wheel. Inductive feedback coupling between the pick-up and the drive coils causes the circuit to operate in an oscillatory mode. The alarm transducer is a speaker which is connected at alarm time to be energized by the oscillatory balance-wheel-impulsing signal. This signal is modulated at the balance-wheel-impulsing frequency to produce a special effect useful for waking people up.

This invention relates generally to timepieces, and in particular to an alarm feature incorporated in a transistorized battery movement.

Most timepieces employ a mechanical oscillator such as a pendulum or a hair spring and balance wheel as the time-measuring device. A clock train of known construction responds to the mechanical oscillator, counting and accumulating the total number of cycles of its oscillation. This total is then displayed in terms of time by a pair of hands in conjunction with a dial face.

In the past, the source of energy for maintaining the oscillations of the balance wheel has been a wound spring. More recently, with the advent of small solid state electronic switching devices such as a transistor, a small dry cell (commonly called a "battery") or other compact source of D.C. potential has been employed to drive the balance wheel. In this case, a miniature transistor switching circuit is used to measure out the power of the cell in precisely timed pulses which drive the balance wheel in synchronism with its natural frequency of mechanical oscillation.

In a typical circuit, the power cell and a drive coil are connected across the collector and emitter of the transistor. Thus a pulse of current is sent through the drive coil whenever the transistor is switched on. A pick-up coil is connected across the base and emitter to control switching of the transistor. Both the drive coil and the pick-up coil are arranged in magnetically interacting relationship with the balance wheel. This may be accomplished either by mounting the coils in a stationary manner and putting a permanent magnet on the balance wheel which moves relative to the coils as the balance wheel oscillates, or it may be done by mounting the coils on the balance wheel, using slip rings for electrical connection thereto, and providing a stationary permanent magnet so that the coils move relative to the magnet as the balance wheel oscillates. The voltage induced in the pick-up coil during such relative motion turns on the transistor. The resulting pulse of current through the drive coil interacts magnetically to impulse the balance wheel and thus sustain its oscillations.

A principal object of this invention is to provide an alarm feature for transistorized D.C. powered timepiece movements of the type just described. Since the dry cell is the only source of power available, it is clear that any alarm will have to be powered by the electrical energy available from this source. However it will not do simply to connect some sort of buzzer or bell device across the terminals of the dry cell at the appropriate time, because this would cause an intolerable current drain. In transistorized "battery" movements, it is always a prime objective to keep the current drain as low as possible so that the "battery" will last as many months as possible.

In accordance with this invention, the principal objective is achieved in a more acceptable manner, and with much lower current drain, by incorporating a loudspeaker directly in the transistor circuit which drives the balance wheel. At the appropriate time, the loudspeaker is switched in between two circuit points which have a time-varying potential difference. The result is an audible loudspeaker sound output derived directly from the operation of the transistor balanced wheel drive circuit, to serve as an alarm.

In a preferred form of the invention, the drive and pick-up coils have mutual coupling so that the circuit is inherently a free-running feedback oscillator. Each pulse of current through the drive coil is then an alternating signal of frequency substantially higher than the frequency of mechanical oscillation of the balance wheel. The advantage of an oscillatory circuit in conjunction with a loudspeaker alarm in accordance with this invention, is that instead of simply producing a series of clicks at a repetition rate keyed to the frequency of mechanical oscillation of the balance wheel, the loudspeaker produces instead a tone the pitch of which is determined by the frequency of electronic oscillation of the drive circuit. Moreover, in accordance with further features of this invention, the sound produced by the loudspeaker can be a steady hum at any desired pitch, modulated in a distinctive manner by a lower frequency chopping rate keyed to the frequency of mechanical oscillation of the balance wheel.

The invention thus briefly summarized will now be described in greater detail in connection with the following drawings:

FIG. 2 is a set of waveform diagrams illustrating the operation of the electronic circuitry employed in this invention.

Figure 1:
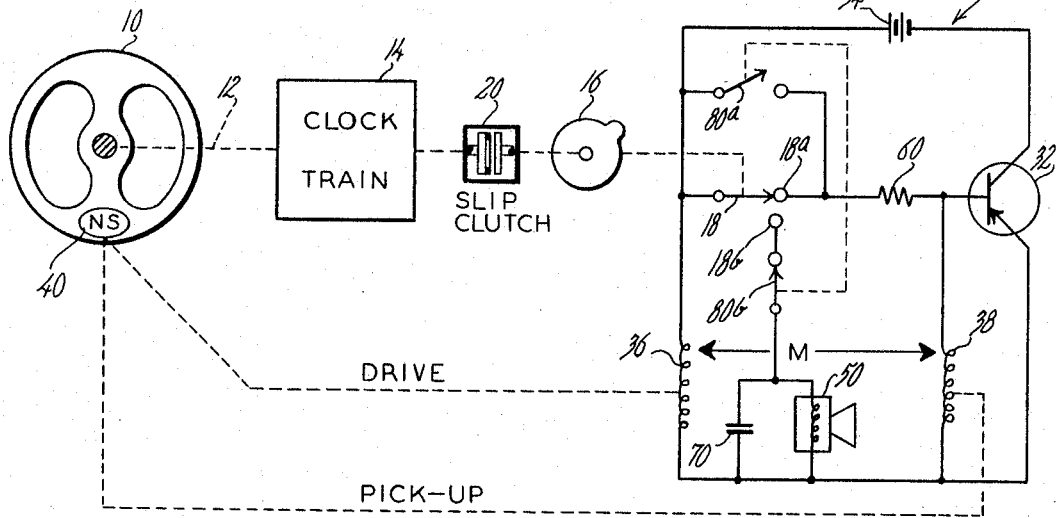
FIG. 1 is a schematic mechanical and electrical circuit diagram illustrating an alarm timepiece according to this invention.

FIG. 1 schematically illustrates the essential components of a transistor clock movement operated from a dry cell. The balance wheel 10 is mounted for rotary oscillation in conjunction with a hair spring (not shown) in the usual manner. Dashed line 12 schematically illustrates that the balance wheel 10 drives a clock train 14. The term "clock train" is used herein and in the appended claims, to denote the drive mechanism, or "escapement," by which the motion of the balance wheel 10 is transmitted to the gears, as well as the reduction gearing which receives this transmitted motion and reduces it to the appropriate speed for generating a time output, e.g. rotation of minute and hour hands, and/or the rotation of an alarm switch cam 16. For a more detailed representation of a typical balance wheel and clock train mechanism suitable for use with a transistorized drive circuit, refer to U.S. Patent No. 2,986,683 of Lavet et al.

The clock train 14 must effect a speed reduction such that the drive transmitted from the balance wheel 10, operating at a typical rate of about one oscillation per second, shows up as a speed of one revolution of the cam 16 for every twelve hours. In this way, the cam 16 is made to operate an alarm switch 18 once during each twelve hour period as is normal for alarm clocks. In order to enable the time of alarm actuation to be selected, the motion of the clock train 14 is transmitted to the cam 16 through a slip clutch 20 which enables the cam 16 to be adjusted to any desired time position relative to the clock train 14.

The device further includes an electronic circuit 30 for sustaining the oscillations of the balance wheel 10. Typically such circuits include a switching transistor 32, a dry cell or "battery" 34, and a drive coil 36. The drive coil 36 and dry cell 34 are connected in series with the emitter and collector of the transistor 32. A pick-up coil 38 is connected between the base and emitter of the transistor 32. As the balance wheel 10 oscillates, a permanent magnet 40 mounted on the wheel sweeps past the pick-up coil 38, inducing a voltage therein. This voltage turns on the transistor 32 and thus sends a pulse of current through the drive coil 36. The magnetic field of the drive coil interacts with the permanent magnet 40 to deliver an impulse to the balance wheel 10 which sustains its oscillations. The drive circuit 30 as so far described, and its cooperation with the balance wheel 10 and permanent magnet 40, are already known.

In accordance with the present invention, a speaker 50 is connected across the drive coil 36 by the alarm switch 18 whenever the latter is actuated by the cam 16 at the predetermined time for the alarm to sound. As a result, the voltage impressed by the circuit 30 across the drive coil 36 during its balance-wheel-impulsing operation is also impressed across the speaker 50, causing the speaker to produce an audible indication which serves as the alarm sound.

If no further refinements are added to the circuit 30 other than those already described in detail, then the audible output of speaker 50 will be a series of clicks. The permanent magnet 40 sweeps past the pick-up coil 38 once in each direction, or a total of twice, during each cycle of balance wheel oscillation. The waveform of the voltage which the magnet induces in the pick-up coil during a single balance wheel cycle is shown in FIG. 2(A). When passing in one direction magnet 40 induces in the coil 38 a positive voltage excursion 51, a negative excursion 52, and another positive excursion 53. When returning in the opposite direction, it induces the similar but reversed-polarity series of voltage excursions 54, 55, and 56. This sequence of voltages constitutes the base-emitter signal $V_{BE}$ applied to the transistor 32. Each of the positive excursions 51, 53, and 55 turns on the transistor 32. Still assuming no further refinements in the circuit, the resulting output voltage $V_o$ developed across the drive coil 36 is shown in FIG. 2(B). This output comprises three unidirectional surges 57, 58, and 59 corresponding to the $V_{BE}$ excursions 51, 53, and 55 respectively. Each of these output surges produces a pair of audible clicks in the speaker 50. For a typical balance wheel oscillation frequency of one cycle per second, therefore, the audible alarm output 50 would consist of three pairs of clicks per second.

Further in accordance with this invention, however, considerable improvement in the operation of this transistor alarm clock device can be achieved in the following manner. As indicated in FIG. 1, the coils 36 and 38 are arranged for mutual inductive coupling therebetween. As a result, there is feedback of the output impressed across coil 36 to the base input coil 38, and the circuit 30 then functions as a free-running transistor feedback oscillator having its own characteristic frequency determined by the various circuit parameters.

In addition a resistor 60 is connected in the circuit 30. If this resistor were replaced by the high impedance of an open circuit, the circuit 30 would have a sufficiently high Q to oscillate merely in response to normal transistor leakage. This would cause the circuit 30 to break into oscillation spontaneously, and to oscillate at all times. But from the standpoint of reducing current drain, it would be more desirable for the circuit 30 to break into oscillation only when it is time to deliver an impulse to the permanent magnet 40 and balance wheel 10. The resistor 60 places a low impedance across the coils 36 and 38, and thus loads the circuit down to the point where the Q is too low to sustain oscillation solely in response to transistor leakage. I.e. the leakage energy is too inefficiently coupled into the base circuit for oscillations to build up regeneratively, and thus transistor 32 remains quiescent. Therefore, as long as the resistor 60 is connected in the circuit and no externally derived signal is induced in pick-up coil 38, the oscillator circuit 30 is inoperative.

But when the permanent magnet 40 sweeps past the pick-up coil 38, the voltage induced therein is sufficient to turn on the transistor 32. As a result, during the time for impulsing the balance wheel 10, the circuit 30 temporarily breaks into oscillation and performs its impulsing function with the oscillatory pulses 61, 62, and 63 (FIG. 2(C)) through the drive coil 36 in place of the unidirectional pulses 57, 58, and 59.

The resistor 60 need not be connected in the specific place illustrated. Any location in which it serves to lower the circuit Q will serve. For example, a resistor of appropriate size may be shunted across the drive coil 36, or across the pick-up coil 38.

The effect of the oscillatory pulses is to drive the balance wheel 10 in the same manner, but with certain advantages. The fact that the drive pulses are oscillatory instead of steady means that there is a smaller average current drawn from the dry cell 34. Also, the transistor can be so biased that the collector-emitter leakage current drawn by this circuit at times $t_1$ (FIG. 2(C)) is much less than the amplified collector-emitter leakage drawn at the corresponding times $t_1$ (FIG. 2(B)) by a non-oscillatory circuit. Thus for a number of reasons the recurrent problem of current drain is minimized by the circuit 30.

This change in the bias point to reduce leakage has the effect of keeping the transistor more tightly cut off. Nevertheless, the circuit can be turned on by small values of pick-up voltage induced in the coil 38, because as soon as the circuit breaks into oscillation the base drive fed back regeneratively by drive coil 36 to the pick-up coil 38 builds up the output amplitude to a value which is independent of the signal induced in pick-up coil 38 by the magnet 40 alone. This gives the transistor clock movement a desirable ready-starting characteristic as well as greater isochronism. It also enables the pick-up coil 38 to be manufactured more economically, using fewer turns of a cheaper, larger size wire, which is less subject to breakage.

Another advantage is that the resistor 60 is a more reliable component than the capacitor which will be connected in its place in a non-oscillatory version of the transistor clock movement circuit.

In addition, the characteristics of the circuit 30 can be varied as desired by changing the value of resistance 60. A larger resistance makes for a clock movement which starts at the slightest motion, but has a larger current drain, particularly at higher temperature. If the resistance is made smaller some of the ready-starting characteristic is sacrificed, but the circuit then has the advantage of lower current drain at elevated temperatures.

Even if the ambient temperature goes higher than the range in which the resistor 60 keeps the transistor 32 cut off, the circuit 30 will still work properly, although it will remain in oscillation all the time. Moreover, this circuit will continue to function even at temperatures so high that a circuit without the resistor 60 would undergo transistor failure due to excessive amplified leakage.

But the most important advantage of the oscillator circuit 30 from the present point of view is the fact that its oscillatory output is ideal for producing a continuous alarm sound when used to drive the alarm speaker 50. Thus, instead of a few separate groups of clicks per second, this invention enables the alarm speaker 50 to produce a continuous hum at any desired pitch throughout the interval when the alarm switch 18 is actuated by the cam 16.

The resistor 60 is connected to terminal 18a of the alarm switch 18. The alarm switch normally contacts this terminal 18a, and is spring-loaded toward that position. This normally keeps the resistor 60 connected in the circuit to make the oscillator 30 inoperative except when it is interacting with the permanent 40 and balance wheel 10. It also cuts out of the circuit the loudspeaker 50 which is connected to the alternative switch terminal 18b. However, when it is time to operate the alarm the cam 16 throws the switch 18 to its terminal 18b. This cuts the resistor 60 out of the circuit, which allows the circuit 30 to oscillate almost continuously during the alarm interval. This mode of operation is illustrated in FIG. 2(D). This also connects the loudspeaker 50 across the drive coil 36 so that the oscillatory output voltage developed across this coil is also impressed across the speaker 50.

As a result, an oscillatory output voltage is generated almost continuously by the circuit 30 during the alarm interval and is applied to drive the speaker 50 to produce a continuous hum as its audible alarm output. The continuity of oscillation is interrupted only at times $t_2$, when the base is reverse-biased by the signal which magnet 40 induces in the pick-up coil 38, and at time $t_3$, when the positive peak induced in that coil saturates the transistor 32. At all other times $t_4$ the absence of resistor 60 from the circuit allows the circuit 30 to oscillate. Thus, the speaker 50 produces a continuous tone at a pitch determined by the frequency of circuit oscillation. The interruptions at times $t_2$ and $t_3$ impart a distinctive modulation to the resulting alarm sound. After the alarm-actuating interval is over, the continued motion of the cam 16 allows the switch 18 to return to terminal 18a, which takes the speaker 50 out of the circuit and permits the oscillator circuit 30 to return to its normal mode of operation previously described.

A typical oscillating frequency for the circuit 30 when the loudspeaker 50 is not connected across the drive coil 36, would be of the order of four or five kilocycles per second, which is in the audio range, but which is not heard quite as loudly as some other frequencies lower in the audible range. Alternatively, the operating frequency of oscillator 30 could be above the audio portion of the sound spectrum during the time that the loudspeaker 50 is disconnected from the switch 18. Furthermore, the speaker 50 illustrated in FIG. 1 is assumed to be of the dynamic type which electrically consists of a coil between its terminals. The effect of connecting this additional inductance across the drive coil 36 by means of the alarm switch 18, is to further increase the natural operating frequency of the oscillator circuit 30.

In view of these factors, a capacitor 70 is connected across the terminals of the speaker 50 so that it is automatically connected into the circuit in parallel therewith when the alarm switch 18 is actuated. The effect of the capacitor 70 is to bring the natural oscillating frequency of the circuit 30 down below the level to which it would otherwise be raised by the inductive characteristics of the speaker 50, and even below the level at which the circuit operates when the speaker 50 is disconnected from the alarm switch 18. The capacitor 70 preferably lowers the operating frequency of the circuit 30 during the alarm interval down to about 3500 cycles per second, which is in the frequency range to which the average human ear exhibits the greatest sensitivity. Thus, the effect of the capacitor 70 is to make the oscillator circuit 30 operate during the alarm interval at a frequency which produces the loudest possible alarm sound for a given power output.

If it is desired not to operate the alarm during a given twelve hour period, the disabling of the alarm mechanism can be achieved in one of two ways. It can be achieved mechanically if the slip clutch 20 is of the kind that can be declutched so as to leave the cam 16 in a nonalarm-actuating position while the clock train 14 continues to advance. Alternatively, this can be accomplished electrically by providing a pair of ganged switches 80a and 80b as shown in FIG. 1. These switches are illustrated in their normal, or alarm-permitting, positions. That is, switch 80b is closed so that the speaker 50 and capacitor 70 are connected to switch terminal 18b. As a result, when the alarm switch 18 is moved to terminal 18b the capacitor 70 and speaker 50 are connected in the circuit for alarm operation. When switch 80b is opened to disable the alarm feature, the capacitor 70 and speaker 50 are disconnected from switch terminal 18b. As a result, they cannot be connected in the circuit even when the cam 16 moves the alarm switch 18 to terminal 18b.

Switch 80a is in parallel across the alarm switch 18. When alarm operation is to be permitted, switch 80a remains open so that the alarm switch 18 is effective to connect either the resistor 60 or the speaker 50 and capacitor 70 into the circuit. When no alarm operation is desired, however, switch 80a is closed to short-circuit the alarm switch 18. This means that resistor 60 remains connected in the circuit to prevent the oscillator 30 from breaking into oscillation except when a voltage is induced in the pick-up coil 38 by the magnet 40. In other words, closure of switch 80a assures normal, non-alarm operation of the circuit 30 even when the alarm switch 18 is transferred to conatct 18b. Thus it will be apparent that to disable the alarm feature electrically it is only necessary to operate a ganged switch arrangement which closes switch 80a and opens switch 80b.

The circuit 30 of FIG. 1, employing the dynamic speaker 50, is preferred because such speakers have a greater tolerance for heat and humidity, and in addition they are cheaper and perform better than other types of speakers, such as crystal speakers. In addition, the parallel combination of the capacitor 70 and speaker 50 provides an excellent means to control the output audio frequency of the alarm, as described above.

Figure 3:
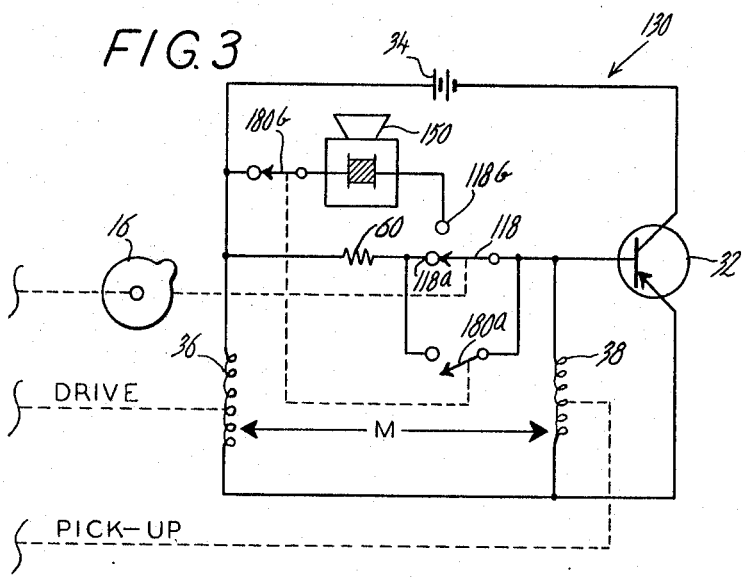
FIG. 3 is a similar but partial schematic diagram illustrating an alternative embodiment of the invention in FIG. 1.

However, if desired, a crystal speaker 150 can be employed in the circuit 130 of FIG. 3. This circuit is identical with the circuit 30 of FIG. 1, except as to certain features which will now be specifically described. Since the crystal speaker 150 electrically consists of a capacitor between its terminals, it has no continuous D.C. path and therefore may be connected in the circuit somewhat differently from the speaker 50. For example, it can be connected in place of the resistor 60 without thereby putting a D.C. path between the base of transistor 32 and the positive terminal of the battery 34, which would have the undesirable effect of applying cut-off bias to the transistor 32 during alarm operation.

For this reason the alarm switch 118 of FIG. 3 is connected so that it moves from its normal contact 118a which connects the cut-off resistor 60 in circuit, to its alarm contact 118b to disconnect the resistor 60 and connect in its place the crystal speaker 150. The alarm shut-off switches are a normally open switch 180a and a normally closed switch 180b ganged therewith. When these alarm-disabling switches are operated, switch 180b is opened so that the speaker 150 is taken out of the circuit even when the alarm switch 118 is moved to terminal 118b by cam 16. Also, switch 180a is closed to short-circuit the alarm switch 118 and keep the resistor 60 in circuit even when the alarm switch is operated.

What has been described is a preferred embodiment and is presently believed to be the best mode of practicing the invention, but it will be clear to those skilled in this art that many modifications may be made without departing from the principles of the invention. For example, in some transistor clock movements that are known, the time-measuring mechanical element is a rotor which turns continuously in the same direction, instead of a balance wheel or pendulum or other mechanical oscillator which moves back and forth in alternating directions. Accordingly this description is intended merely as an illustrative example, the broader scope of the invention being stated in the appended claims. In particular, since the choice of a particular mechanical time-measuring device is not material so far as the present 3,318,084 invention is concerned, this has been described in the claims simply as "a mechanical device for performing a periodic movement."

The invention claimed is:

1. An alarm timepiece including:
a mechanical device for performing a periodic movement;
a time train operating in response to movement of said mechanical device;
and means including a switching circuit arranged to pick up a pulsating input from said moving mechanical device and to produce a corresponding output for impulsing said mechanical device in synchronism with said movement thereof to sustain such movement;
said circuit including an electrical-to-audio transducer;
said circuit further including a switch operated by said time train at a predetermined time;
wherein the improvement comprises:
said transducer and said switch being arranged to connect said transducer to said circuit to apply voltage modulated by said pulsating input from said time-train-operating mechanical device to energize said transducer pulsatingly in synchronism with said periodic movement of said mechanical device when said switch is operated.

2. An alarm timepiece including:
a mechanical device for performing periodic movement;
a time train operating in response to movement of said mechanical device;
and means including a switching circuit arranged to pick up a pulsating input from said moving mechanical device and to produce a corresponding output for impulsing said mechanical device in synchronism with said movement thereof to sustain said movement thereof;
said circuit including an electrical-to-audio transducer;
said circuit further including a switch operated by said time train at a predetermined time;
wherein the improvement comprises:
said transducer and said switch being arranged to connect said transducer to said circuit to apply a voltage modulated by said pulsating input from said time-train-operating mechanical device to energize said transducer pulsatingly in synchronism with said periodic movement of said mechanical device when said switch is operated;
said circuit being arranged to make said voltage vary further at least during said pulsations at least when said switch is operated, whereby said transducer then produces an alarm.

3. An alarm timepiece including:
a mechanical device for performing a periodic movement;
a time train operating in response to movement of said mechanical device;
and means including a switching circuit arranged to pick up a pulsating input from said moving mechanical device and to produce a corresponding output for impulsing said mechanical device in synchronism with said movement thereof to sustain said movement thereof;
said circuit including an electrical-to-audio transducer;
said circuit further including a switch operated by said time train at a predetermined time;
wherein the improvement comprises:
said transducer and said switch being arranged to connect said transducer to said circuit to apply a voltage modulated by said pulsating input from said time-train-operating mechanical device to energise said transducer pulsatingly in synchronism with said periodic movement of said mechanical device when said switch is operated;
said circuit being arranged to operate so that said voltage further varies in a manner for said transducer to produce an alarm at least when said switch is operated.

4. An alarm timepiece including:
a mechanical device for performing a periodic movement;
a time train operating in response to movement of said mechanical device;
and means including an electronic switching circuit arranged to pick up a pulsating input from said moving mechanical device and to produce a corresponding output for impulsing said mechanical device in synchronism with said movement thereof to sustain said movement thereof;
said circuit including an electrical-to-audio transducer;
said circuit further including a switch operated by said time train at a predetermined time;
wherein the improvement comprises:
said transducer and said switch being arranged to connect said transducer to said circuit to apply a voltage modulated by said pulsating input from said time-train-operating mechanical device to energize said transducer pulsatingly in synchronism with said periodic movement of said mechanical device when said switch is operated;
said circuit being arranged to oscillate in such manner that said voltage varies at a frequency in the human audible range at least when said switch is operated, whereby said transducer then produces an alarm.

5. An alarm timepiece including:
a mechanical device for performing a periodic movement;
a time train operating in response to movement of said mechanical device;
and means including an electronic audio frequency oscillator circuit arranged to pick up a pulsating input from said moving mechanical device and to produce a corresponding output for impulsing said mechanical device in synchronism with said movement thereof to sustain said movement thereof;
said circuit including an electrical-to-audio transducer;
said circuit further including a switch operated by said time train at a predetermined time;
wherein the improvement comprises:
said transducer and said switch being arranged to connect said transducer to said circuit to apply an oscillatory electrical signal modulated by said pulsating input from said time-train-operating mechanical device to energize said transducer pulsatingly in synchronism with said periodic movement of said mechanical device when said switch is operated, whereby said transducer then produces an alarm.

6. An alarm timepiece including:
a mechanical device for performing a periodic movement;
a time train operating in response to movement of said mechanical device;
and means including an electronic oscillator circuit arranged to pick up a pulsating input from said moving mechanical device and to produce a corresponding output for impulsing said mechanical device in synchronism with said movement thereof to sustain said movement thereof;
said circuit including an electrical-to-audio transducer;
said circuit further including a switch operated by said time train at a predetermined time;
wherein the improvement comprises:
said transducer and said switch being arranged to connect said transducer to said circuit to apply an oscillatory electrical signal modulated by said pulsating input from said time-train-operating mechanical device to energize said transducer pulsatingly in synchronism with said periodic movement of said mechanical device when said switch is operated;

said circuit including means arranged to make the frequency of oscillation of said circuit such that said signal is in the human audible range at least when said switch is operated, whereby said transducer then produces an alarm.

7. An alarm timepiece including:

a mechanical device for performing a periodic movement;

a time train operating in response to movement of said mechanical device;

and means including an electronic oscillator circuit arranged to pick up a pulsating input from said moving mechanical device and to produce a corresponding output for pulsing said mechanical device in synchronism with said movement thereof to sustain said movement thereof;

said circuit including an electrical-to-audio transducer;

said circuit further including a switch operated by said time train at a predetermined time;

wherein the improvement comprises:

said transducer and said switch being arranged to connect said transducer to said circuit to apply an oscillatory electrical signal modulated by said pulsating input from said time-train-operating mechanical device to energize said transducer pulsatingly in synchronism with said periodic movement of said mechanical device when said switch is operated;

said circuit including further means arranged to make said circuit oscillate at a frequency which is lower than normal and is in the human audible range when said switch is operated, whereby said transducer then produces an alarm.

8. An alarm timepiece including:

a mechanical device for performing a periodic movement;

a time train operating in response to movement of said mechanical device;

and means including an oscillator circuit arranged to pick up a pulsating input from said moving mechanical device and to produce a corresponding output for impulsing said mechanical device in synchronism with said movement thereof to sustain said movement thereof;

said circuit including an electronic switching device and means normally connected to cause said electronic switching device to remain off but responsive to said movement of said mechanical device to bias said electronic switching device on at intervals for impulsing of said mechanical device;

said circuit including an electrical-to-audio transducer;

said circuit further including a time switch operated by said time train at a predetermined time;

wherein the improvement comprises:

said transducer and said time switch being connected to cause said electronic switching device to remain on, and to connect said transducer to said circuit to apply an oscillatory electrical signal modulated by said pulsating input from said time-train-operating mechanical device to drive said transducer pulsatingly in synchronism with said periodic movement of said mechanical device, when said time switch is operated;

said circuit including means arranged to make the frequency of oscillation of said circuit such that said signal is in the human audible range at least when said time switch is operated, whereby said transducer then produces an alarm.

9. An alarm timepiece including:

a mechanical device for performing a periodic movement;

a time train operating in response to movement of said mechanical device;

and means including an oscillator circuit arranged to pick up a pulsating input from said moving mechanical device and to produce a corresponding output for impulsing said mechanical device in synchronism with said movement thereof to sustain said movement thereof;

said circuit including an electronic switching device, a sufficiently low D.C. impedance normally connected to lower the Q of said oscillator circuit to prevent oscillatory operation thereof, and means responsive to said movement of said mechanical device to bias said electronic device on at intervals for impulsing of said mechanical device;

said circuit including an electrical-to-audio transducer;

said circuit further including a time switch operated by said time train at a predetermined time;

wherein the improvement comprises:

said low impedance, said transducer, and said time switch being connected to cut said low impedance out of said circuit to cause said circuit to oscillate, and to connect said transducer to said circuit to apply an oscillatory electrical signal modulated by said pulsating input from said time-train-operating mechanical device to energize said transducer pulsatingly in synchronism with said periodic movement of said mechanical device, when said time switch is operated;

said circuit including means arranged to make the frequency of oscillation of said circuit such that said signal is in the human audible range at least when said time switch is operated, whereby said transducer then produces an alarm.

10. An alarm timepiece including:

a mechanical device for performing a periodic movement;

a time train operating in response to movement to said mechanical device;

and means including an electronic oscillator circuit arranged to pick up a pulsating input from said moving mechanical device and to produce a corresponding output for impulsing said mechanical device in synchronism with said movement thereof to sustain said movement thereof;

said circuit including an electronic switching device having input and output terminals, a drive coil connected in series with output terminals of said electronic device, a pick-up coil connected in series with input terminals of said electronic device, and a sufficiently low resistance normally connected to at least one of said coils in a manner to lower the Q of said oscillator whereby to prevent oscillation thereof, said pick-up coil being responsive to said movement of said mechanical device to bias said electronic device on at intervals for impulsing of said mechanical device;

said circuit including a speaker of the type including a discontinuous path between the terminals thereof;

said circuit further including a switch operated by said time train at a predetermined time;

wherein the improvement comprises:

said resistance, said speaker, and said switch being arranged to disconnect said resistance from said circuit and connect said speaker in its place whereby said circuit applies an oscillatory electrical signal modulated by said pulsating input from said time-train-operating mechanical device to drive said speaker pulsatingly in synchronism with said periodic movement of said mechanical device when said switch is operated.

11. An alarm timepiece including:

a mechanical device for performing a periodic movement;

a time train operating in response to movement of said mechanical device;

and means including an electronic oscillator circuit arranged to pick up a pulsating input from said moving mechanical device and to produce a corresponding output for impulsing said mechanical device in synchronism with said movement thereof to sustain said movement thereof;

said circuit including an electronic switching device having input and output terminals, a drive coil connected in series with output terminals of said electronic device, a pick-up coil connected in series with input terminals of said electronic device, and a sufficiently low resistance normally connected to at least one of said coils in a manner to lower the Q of said oscillator whereby to prevent oscillation thereof, said pick-up coil being responsive to said movement of said mechanical device to bias said electronic device on at intervals for impulsing of said mechanical device;

said circuit including a speaker of the type including a continuous path between the terminals thereof;

said circuit further including a switch operated by said time train at a predetermined time;

wherein the improvement comprises:

said resistance, said speaker, and said switch being arranged to disconnect said resistance from said circuit and connect said speaker across said drive coil whereby said circuit applies an oscillatory electrical signal modulated by said pulsating input from said time-train-operating mechanical device to drive said speaker pulsatingly in synchronism with said periodic movement of said mechanical device when said switch is operated.

12. An alarm timepiece as in claim 11, wherein:
said speaker is inductive;
and a capacitor is connected across said speaker.

13. An alarm timepiece as in claim 10, wherein:
said speaker is capacitive.

References Cited by the Examiner

UNITED STATES PATENTS

| | | | |
|---|---|---|---|
| 3,091,076 | 5/1963 | Reich | 58—38 |
| 3,209,529 | 10/1965 | Hetzel | 58—39.5 |

FOREIGN PATENTS 1,214,428  4/1960  France.

RICHARD B. WILKINSON, *Primary Examiner.*

G. F. BAKER, *Assistant Examiner.*